United States Patent
Chen et al.

(10) Patent No.: US 12,530,849 B2
(45) Date of Patent: Jan. 20, 2026

(54) METHOD, APPARATUS, COMPUTER DEVICE AND STORAGE MEDIUM FOR THREE-DIMENSIONAL RECONSTRUCTION OF INDOOR STRUCTURE

(71) Applicant: WUHAN UNIVERSITY, Hubei (CN)

(72) Inventors: Jiangping Chen, Hubei (CN); Siyuan Wang, Hubei (CN); Pengcheng Zhao, Hubei (CN); Bin Zhang, Hubei (CN); Bohua Wang, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 267 days.

(21) Appl. No.: 18/453,238

(22) Filed: Aug. 21, 2023

(65) Prior Publication Data
US 2024/0087231 A1    Mar. 14, 2024

(30) Foreign Application Priority Data
Sep. 13, 2022    (CN) .......................... 202211109734.4

(51) Int. Cl.
*G06T 17/20*    (2006.01)
*G06T 5/70*    (2024.01)
(Continued)

(52) U.S. Cl.
CPC ............... *G06T 17/20* (2013.01); *G06T 5/70* (2024.01); *G06T 7/11* (2017.01); *G06T 7/187* (2017.01);
(Continued)

(58) Field of Classification Search
CPC ... G06T 17/20; G06T 5/70; G06T 7/11; G06T 7/187; G06T 7/60; G06T 15/205;
(Continued)

(56) References Cited

U.S. PATENT DOCUMENTS

2018/0205941 A1*   7/2018   Kopf .................... H04N 13/261
2018/0276885 A1*   9/2018   Singh ...................... G06T 7/579
(Continued)

OTHER PUBLICATIONS

Liu, Chen, Jiaye Wu, and Yasutaka Furukawa. "Floornet: A unified framework for floorplan reconstruction from 3d scans." Proceedings of the European conference on computer vision (ECCV). 2018. (Year: 2018).*
(Continued)

*Primary Examiner* — Daniel F Hajnik
*Assistant Examiner* — Chris Alejandro Puntier
(74) *Attorney, Agent, or Firm* — JCIP GLOBAL INC.

(57) ABSTRACT

The disclosure provides a method, an apparatus and a computer device for three-dimensional reconstruction of an indoor structure based on a two-dimensional video, wherein the method comprises: generating a color point cloud of three-dimensional structure of a house by using the video data of the house; regularizing the color point cloud of the house; extracting a plan of the house based on the color point cloud of the house; and constructing a three-dimensional model of the house in real life. The disclosure realizes autonomous and rapid construction of a three-dimensional model of a house by the general public, and realizes a low-cost, efficient and convenient three-dimensional visual digital representation of the house.

8 Claims, 2 Drawing Sheets

(51) Int. Cl.
*G06T 7/11* (2017.01)
*G06T 7/187* (2017.01)
*G06T 7/60* (2017.01)
*G06T 15/20* (2011.01)
*G06T 19/20* (2011.01)

(52) U.S. Cl.
CPC .............. *G06T 7/60* (2013.01); *G06T 15/205* (2013.01); *G06T 19/20* (2013.01); *G06T 2207/10016* (2013.01); *G06T 2207/10028* (2013.01); *G06T 2207/10032* (2013.01); *G06T 2207/20021* (2013.01); *G06T 2207/30244* (2013.01); *G06T 2210/04* (2013.01); *G06T 2210/56* (2013.01); *G06T 2219/2012* (2013.01); *G06T 2219/2016* (2013.01)

(58) Field of Classification Search
CPC ........... G06T 19/20; G06T 2207/10016; G06T 2207/10028; G06T 2207/10032; G06T 2207/20021; G06T 2207/30244; G06T 2210/04; G06T 2210/56; G06T 2219/2012; G06T 2219/2016
See application file for complete search history.

(56) References Cited

U.S. PATENT DOCUMENTS

2019/0205485 A1* 7/2019 Rejeb Sfar .............. G06F 30/13
2020/0364929 A1* 11/2020 Li ............................ G06T 7/62

OTHER PUBLICATIONS

Zhong, Yu, et al. "A Fast and Precise Plane Segmentation Framework for Indoor Point Clouds." Remote Sensing 14.15 (2022): 3519. (Year: 2022).*

* cited by examiner

METHOD, APPARATUS, COMPUTER DEVICE AND STORAGE MEDIUM FOR THREE-DIMENSIONAL RECONSTRUCTION OF INDOOR STRUCTURE

CROSS-REFERENCE TO RELATED APPLICATION

This application claims the priority benefit of Chinese patent application NO. 202211109734.4, filed on Sep. 13, 2022. The entirety of the above-mentioned patent application is hereby incorporated by reference herein and made a part of this specification.

BACKGROUND

Technical Field

The present invention relates to the technical field of real-life three-dimensional modeling, and in particular relates to a method, an apparatus, a computer device and a storage medium for three-dimensional (3D) reconstruction of an indoor structure based on a two-dimensional (2D) video.

Description of Related Art

Indoor is an important place for human life, entertainment and study. How to quickly model indoor scenes in three dimensions has become a hot issue in current research. So far, people are modeling indoor scenes through various ways, and quite a lot of progress has been made.

Currently there are three common methods for modeling indoor scenes. One is the use of three-dimensional modeling software to manually establish a three-dimensional model, commonly used software such as 3dsMax, Maya and so on. By mathematically representing a variety of geometric elements such as points, lines, surfaces, and bodies, a 3D model is built through a series of operations. This geometric interactive modeling usually uses the data provided by indoor construction drawings, CAD (computer aided design), etc. and highly assisted data to restore the indoor model. The method is technically mature and widely used. However, due to the different shapes and structures of indoor scenes, the realization of reconstruction of indoor scenes by interactive methods is very time-consuming and requires high professional skills of operators. Another method is to acquire 3D data through 3D scanning equipment. For example, the 3D spatial coordinates and color information of each sampling point of the indoor scene are directly obtained by laser scanner. This method has achieved many research results. However, because the cost of the equipment is too high, the process of processing data is cumbersome, and the conditions of use are harsh, so it is not possible to realize the acquisition of data at anytime and anywhere, this method can not be accepted and used by the public very quickly. The third method is the image-based modeling method, through the reconstruction and modeling carried out by the image as a data source, based on the image feature points, different descriptions of the detected feature points, and then use the parallax principle to calculate the three-dimensional information, which is stable, but there are certain requirements for image shooting, such as clarity, coverage and overlap, etc., and it is necessary to take a large number of photographs in order to be able to screen out images that meet the modeling conditions. However, it requires a large number of photos to be taken to filter out the images that meet the modeling conditions, and it is necessary to assign professional personnel to the site for data collection.

SUMMARY

The present invention provides a method, an apparatus, a computer device and a non-transitory computer-readable storage medium for performing three-dimensional reconstruction of an indoor structure based on a two-dimensional video, for solving, or at least partially solving, a technical problem of low reconstruction efficiency existing in the prior art.

In order to solve the above technical problems, a first aspect of the present invention provides a method for performing three-dimensional reconstruction of an indoor structure based on a two-dimensional video, comprising:
- S1: generating a color point cloud of the 3D structure of a house using a captured panoramic video data of the house;
- S2: regularizing the generated color point cloud of the 3D structure of the house;
- S3: vertically projecting the regularized color point cloud of the 3D structure of the house onto a horizontal plane, fitting a straight line according to a density of the projected points, and performing region division based on the fitted straight line and the spatial division algorithm, get the vector polygon units that divides the space, and splicing the vector polygon units to get the vector room plan data, the vector room plan data is the vector line map layer obtained by projecting the color point cloud of the 3D structure of the house onto the 2D plane;
- S4: performing reconstruction of a 3D model of the house based on the vector room plan data.

In one embodiment, step S1 comprises:
- S1.1: establishing a sequence image set on the captured panoramic video data of the house by means of a video stream frame extraction technique wherein the sequence image set is a sequence of images with temporal correlation;
- S1.2: performing image multi-view projection correction on the sequence image set to obtain a sequence multi-view image;
- S1.3: based on the obtained sequence multi-view image, generating a 3D sparse point cloud by sequence multi-view image dense matching and SFM (structure from motion) reconstruction techniques;
- S1.4: generating a dense 3D point cloud based on the 3D sparse point cloud using a patch-based multi-view stereo method as the color point cloud of the 3D structure of the house.

In one embodiment, step S2 comprises:
- S2.1: performing a smoothing operation on the color point cloud of the 3D structure of the house by surface fitting;
- S2.2: segmenting the point cloud plane using a region growing algorithm, fitting a planar point cloud using an iterative reweighted least squares method, and calculating a normal vector of the point cloud plane;
- S2.3: screening vertical planes as alternative wall surfaces based on the calculated normal vectors of the point cloud planes, and then eliminating planes in the screened vertical planes whose heights are below a height threshold, and using the retained vertical planes as wall surfaces.

In one embodiment, step S4 comprises:
S4.1: obtaining floor and ceiling elevation information for each room from a point cloud by using the vector room plan data and using a height histogram method;
S4.2: triangulating the ceiling, wall surfaces, and floor polygons of each room using the Delaunay triangulation method to construct a final three-dimensional model of the room.

In one embodiment, step S1.2 comprises: converting an original panoramic image into a 3D panoramic spherical space by using an equirectangular projected spherical panoramic model;

$$\begin{cases} x_{pano}^q = w \cdot \theta_q/2\pi + (w/2 - 1) \\ y_{pano}^q = (h/2 - 1) - h \cdot \phi_q/\pi \end{cases}, (-\pi < \theta \le \pi, -\pi/2 < \phi \le \pi/2) \quad (1)$$

$$\begin{cases} \theta_q = (2\pi \cdot x_{pano}^q + 2\pi)/w - \pi \\ \phi_q = \pi/2 - (\pi - 2\pi \cdot y_{pano}^q)/2h \end{cases}, (0 \le x_{pano}^q < w, 0 \le y_{pano}^q < h) \quad (2)$$

where, $x_{pano}^q$ represents the coordinates of the image point of the $q^{th}$ image in the original panoramic image, $y_{pano}^q$ represents the coordinates of the image point of the $q^{th}$ image in the original panoramic image in the space of the three-dimensional panoramic sphere, w represents the length of the original panoramic image, h represents the width of the original panoramic image, q represents the number of images, $\theta_q$ represents the angle of the computed image point in the three-dimensional panoramic sphere in the horizontal x-positive direction, and $\phi_q$ represents the angle of the computed image point in the three-dimensional panoramic sphere in the vertical y-positive direction;

by surrounding the three-dimensional panoramic sphere with a cube whose side length is equal to the diameter of the 3D panoramic sphere, points on the sphere surface of the 3D panoramic sphere are mapped onto a corresponding surface of the cube to obtain 6 multi-view images;

the cube is rotated by 45°, and the points on the spherical surface of the 3D panoramic sphere are mapped onto the corresponding surface of the cube again to obtain another 6 multi-view images;

no less than 6 images in the horizontal x-positive direction and no less than 2 images in the vertical y-positive direction from the 12 multi-view images are selected to constitute the sequence multi-view image of the house.

In one embodiment, step S1.3 comprises:
using a scale-invariant feature transform (SIFT) feature operator to extract feature points for the sequence multi-view image of the house;
using the image matching method of supporting line voting and affine invariant constraint, matching the multi-view images of the house to obtain the matching point set of the house sequence images;
performing aerial triangulation and sparse point cloud generation on the matching point set of house sequence images by SFM, and recovering a camera position of each panoramic image frame to generate a 3D sparse point cloud of the house.

In one embodiment, step S2.3 comprises:
using the formula $|n \cdot v| \le \epsilon$ is used to determine whether the fitted point cloud plane is perpendicular or not, and if it is perpendicular, the fitted point cloud plane is set as a wall surface, where n represents the normal vector of the point cloud plane, $v=(0, 0, 1)^T$, and $\epsilon$ represents the cosine of the angular threshold, and when the angular threshold is 90°±1°, $\epsilon = \cos(90°\pm1°)$;
within the preserved vertical planes, eliminating planes whose height h<a in the vertical planes to obtain a wall surface that satisfies the condition, with a being the height threshold.

Based on the same inventive conception, the second aspect of the present invention provides a device for 3D reconstruction of an indoor structure based on a 2D video, comprising:
a point cloud generation module for generating a color point cloud of 3D structure of the house using the captured panoramic video data of the house;
a regularization processing module for regularizing the generated color point cloud of 3D structure of the house;
a plan data extraction module, used to vertically project the color point cloud of 3D structure of the house after regularizing the processing onto the horizontal plane, fit a straight line according to the density of the projected points, performing region division based on the fitted straight line and spatial division algorithm to get the vector polygon unit that divides the space, and splice the vector polygon unit to get the vector room plan data, wherein the vector room plan data is a vector line map layer of the house obtained by projecting the color point cloud of the 3D structure of the house onto the 2D plane;
a 3D reconstruction module, used to perform reconstruction of the 3D model of the house based on the vector room plan data.

Based on the same inventive conception, a third aspect of the present invention provides a non-transitory computer-readable storage medium having a computer program stored thereon which implements the method described in the first aspect when the computer program is executed.

Based on the same inventive conception, a fourth aspect of the present invention provides a computer device comprising a memory, a processor and a computer program stored on the memory and runnable on the processor, said processor implementing the method described in the first aspect when said computer program is executed.

The advantages and beneficial technical effects of the present invention over the prior art are as follows.

The present invention proposes a method for three-dimensional reconstruction of an indoor structure based on a two-dimensional video comprises: generating a color point cloud of three-dimensional structure of a house using captured panoramic video data of the house, and then performing a regularization process, vertically projecting the color point cloud of the three-dimensional structure of the house after the regularization process onto a horizontal plane, fitting a straight line according to the density of the projected points, and performing a region division based on the straight line obtained by the fitting and the spatial division algorithm to get the vector room plan data, and finally performing reconstruction of the 3D model of the house based on the obtained vector room plan data. On the one hand, the motion reconstruction method is utilized to determine the spatial and geometric relationship of the target through the movement of the camera, which significantly improves the efficiency and accuracy of the construction of the real-life 3D model and reduces the cost of the 3D modeling of the house. On the other hand, a more mobile, faster and flexible data acquisition method is provided and requires only an ordinary camera, which enables the public to complete the data acquisition work autonomously and simply, and reduces the threshold of rapid house modeling. Through the above method, the public can independently and quickly construct the three-dimensional model of the house, and realize the low-cost, efficient and convenient three-dimensional visual digital expression of the house. Using the panoramic video photogrammetry processing technology, the efficiency and accuracy of the construction of the three-dimensional model of the house can be significantly improved, and the cost of the real-life three-dimensional modeling of the house is reduced.

BRIEF DESCRIPTION OF THE DRAWINGS

In order to more clearly illustrate the technical solutions in the embodiments or prior art of the present invention, the accompanying drawings to be used in the description of the embodiments or prior art will be briefly introduced below, and it will be obvious that the accompanying drawings in the following description are some of the embodiments of the present invention, and that, for the person of ordinary skill in the field, it is possible to obtain other attachments on the basis of the accompanying drawings, without putting in any creative labor.

DESCRIPTION OF THE EMBODIMENTS

The present invention proposes a set of three-dimensional methods and technical processes for building a house structure using a video shot by the public, realizing the independent and rapid construction of a real-life three-dimensional model of a house by the public, and realizing a low-cost, highly efficient and convenient three-dimensional visualized digital expression of a house. It can be applied to realize crowdsourced three-dimensional modeling and visualization expression of houses, provide support for various kinds of buying, selling and renting houses, and also provide data support for online decoration and maintenance of houses, which has a broad application prospect in the fields of housing transaction, housing maintenance, and housing safety management.

In order to make the objects, technical solutions and advantages of the embodiments of the present invention clearer, the technical solutions in the embodiments of the present invention will be described clearly and completely in the following in conjunction with the accompanying drawings in the embodiments of the present invention, and it is obvious that the described embodiments are a part of the embodiments of the present invention and not all of the embodiments. Based on the embodiments in the present invention, all other embodiments obtained by a person of ordinary skill in the art without making creative labor fall within the scope of protection of the present invention.

Embodiment 1

Embodiments of the present invention provide a method for 3D reconstruction of an indoor structure based on a 2D video, comprising:

S1: generating a color point cloud of 3D structure of a house using the captured panoramic video data of the house;

S2: regularizing the generated color point cloud of the 3D structure of the house;

S3: vertically projecting the regularized color point cloud of 3D structure of the house onto the horizontal plane, fitting a straight line according to the density of the projected points, and performing region division based on the fitted straight line and the spatial division algorithm to get the vector polygon units that divides the space, and splicing the vector polygon units to get the vector room plan data, wherein the vector room plan data is a vector line map layer obtained by projecting the color point cloud of 3D structure of the house onto the 2D plane;

S4: performing reconstruction of a 3D model of the house based on the vector room plan data.

Specifically, for the three-dimensional scene reconstruction of a two-dimensional video, the monocular continuous video contains a large amount of depth information and has more ways of obtaining it, and compared to the traditional three-dimensional reconstruction method, using a cell phone as a data acquisition device is low-cost and simple to operate, and the public can shoot the video by themselves to achieve three-dimensional reconstruction and save labor.

Figure 1:
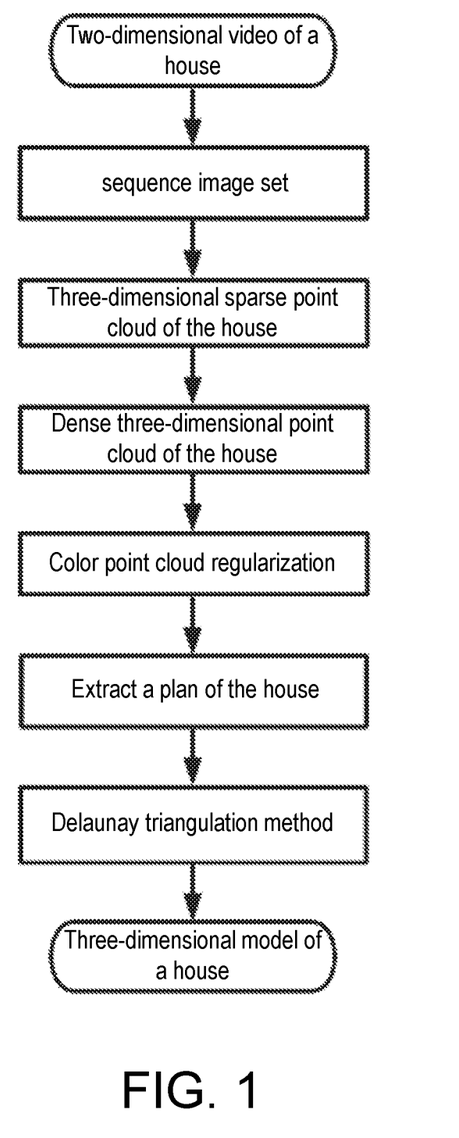
FIG. 1 is a flow diagram of a method for performing three-dimensional reconstruction of an indoor structure based on a two-dimensional video in an embodiment of the present invention.

Please refer to FIG. 1 for a flow diagram of a method for three-dimensional reconstruction of an indoor structure based on a two-dimensional video in an embodiment of the present invention.

The panoramic video data of the house in S1 can be shot by a camera. The point cloud is regularized to improve the accuracy.

In one embodiment, step S1 comprises:

S1.1: establishing a sequence image set on the captured panoramic video data of the house by means of a video stream frame extraction technique, wherein the sequence image set is a sequence of images with temporal correlation;

S1.2: performing image multi-view projection correction on the sequence image set to obtain a sequence multi-view image;

S1.3: based on the obtained sequence multi-view image, generating a 3D sparse point cloud by sequence multi-view image dense matching and SFM reconstruction techniques;

S1.4: generating a dense 3D point cloud based on the 3D sparse point cloud using a patch-based multi-view stereo (PMVS) method as a color point cloud of 3D structure of the house.

Specifically, the SFM (structure from motion) reconstruction technique is a technique for estimating 3D structure from a series of multiple 2D image sequences containing visual motion information. Patch-based Multi-view Stereo (PMVS) method.

Wherein, after generating a dense 3D point cloud at step S1.4, the embodiment of the present invention also comprises: generating an irregular triangular mesh Mesh of the house based on the dense 3D point cloud of the house; and then traversing through the Mesh patches of the house, calculating the normal vectors, searching for the most suitable texture blocks identified in the corresponding multi-view images, and mapping them onto the Mesh patches, to obtain a 3D model of the house with a realistic sense of texture.

In one embodiment, step S2 comprises:
S2.1: perform a smoothing operation on the color point cloud of 3D structure of the house by surface fitting;
S2.2: segmenting the point cloud plane using a region growing algorithm, fitting the planar point cloud using an iterative reweighted least squares method, and calculating a normal vector of the point cloud plane;
S2.3: screening vertical planes as alternative wall surfaces based on the calculated normal vectors of the point cloud planes, and then eliminating planes in the screened vertical planes whose heights are below a height threshold, and using the retained vertical planes as wall surfaces.

Specifically, after passing through step S2.1, a smoothed processed point cloud plane can be obtained. By the operation in step S2.1, cutting or filling of the model can be realized to reduce the model deformation. The region growing algorithm is a segmentation algorithm in the prior art, and the region growing algorithm is utilized for segmenting the point cloud plane, searching for similar sets of points and merging them, segmenting to obtain different objects, and then utilizing the iterative reweighted least squares method for fitting the planar point cloud, and calculating the normal vector n of the point cloud plane.

Based on the calculated normal vector to determine whether the point cloud plane is perpendicular or not, if it is perpendicular then it is used as an alternative wall plane, otherwise it is eliminated. After screening out the vertical planes, further screening is done based on the height.

In one embodiment, step S4 comprises:
S4.1: obtaining floor and ceiling elevation information for each room from a point cloud by using vector room plan data and using a height histogram method;
S4.2: triangulating the ceiling, wall surfaces, and floor polygons of each room using the Delaunay triangulation method to construct a final three-dimensional model of the room.

Specifically, Delaunay triangulation Delaunay triangulation is a triangular sectioning method.

In step S4.1, the number of point clouds of the elevation histogram is presented as two peaks, which are the elevation values of the floor and ceiling of the room, respectively. In step S4.2, the ceiling, wall surfaces and floor polygons of each room are triangulated by using Delaunay triangulation, and after obtaining the relationship between the points, the vector plan is mapped back to the three-dimensional space using the topological relationship, and the constructed 3D model of the room is output in the form of a vector Mesh grid.

In one embodiment, step S1.2 comprises:
converting the original panoramic image into a 3D panoramic spherical space by using an equirectangular projected spherical panoramic model;

$$\begin{cases} x^q_{pano} = w \cdot \theta_q/2\pi + (w/2 - 1) \\ y^q_{pano} = (h/2 - 1) - h \cdot \phi_q/\pi \end{cases}, (-\pi < \theta \le \pi, -\pi/2 < \phi \le \pi/2) \quad (1)$$

$$\begin{cases} \theta_q = (2\pi \cdot x^q_{pano} + 2\pi)/w - \pi \\ \phi_q = \pi/2 - (\pi - 2\pi \cdot y^q_{pano})/2h \end{cases}, (0 \le x^q_{pano} < w, 0 \le y^q_{pano} < h) \quad (2)$$

Where, $x^q_{pano}$ represents the coordinates of the image point of the $q^{th}$ image in the original panoramic image, $y^q_{pano}$ represents the coordinates of the image point of the $q^{th}$ image in the original panoramic image in the space of the three-dimensional panoramic sphere, w represents the length of the original panoramic image, h represents the width of the original panoramic image, q represents the number of images, $\theta_q$ represents the angle of the computed image point in the three-dimensional panoramic sphere in the horizontal x-positive direction, and $\phi_q$ represents the angle of the computed image point in the three-dimensional panoramic sphere in the vertical y-positive direction;

by surrounding the 3D panoramic sphere with a cube whose side length is equal to the diameter of the 3D panoramic sphere, points on the sphere surface of the 3D panoramic sphere are mapped onto a corresponding surface of the cube to obtain 6 multi-view images;

the cube is rotated by 45°, and the points on the spherical surface of the 3D panoramic sphere are mapped onto the corresponding surface of the cube again to obtain another 6 multi-view images;

no less than 6 images in the horizontal x-positive direction and no less than 2 images in the vertical y-positive direction from the 12 multi-view images are selected to constitute the sequence multi-view images of the house.

Specifically, the original panoramic image can be converted into the 3D panoramic sphere space by equations (1) and (2), and then by constructing the cube enclosing the panoramic sphere and performing the mapping of the sphere's points, 6 multi-view images are obtained respectively, and finally the images are screened from them to form the sequence multi-view image of the house.

In one embodiment, step S1.3 comprises:
using the SIFT feature operator to extract feature points for the sequence multi-view image of the house;
using an image matching method that supports line voting and affine invariant constraint, matching multi-view images of the house to obtain a matching point set of house sequence images;
performing aerial triangulation and sparse point cloud generation on the matching point set of the house sequence images by SFM, recovering the camera position of each panoramic image frame, and generating a three-dimensional sparse point cloud of the house.

In one embodiment, step S2.3 comprises:
using the formula $|n \cdot v| \le \epsilon$ to determine whether the fitted point cloud plane is perpendicular or not, and if it is perpendicular, the fitted point cloud plane is set as a wall surface, where n represents the normal vector of the point cloud plane, $v = (0, 0, 1)^T$, and $\epsilon$ represents the cosine of the angular threshold, and when the angular threshold is $90° \pm 1°$, $\epsilon = \cos(90° \pm 1°)$;
within the retained vertical planes, eliminating planes with heights h<a of the vertical planes to obtain a wall surface that satisfies the condition, wherein a represents the height threshold.

Wherein, the height threshold a can be selected according to the actual situation, for example, 1.5 m.

Embodiment 2

Figure 2:
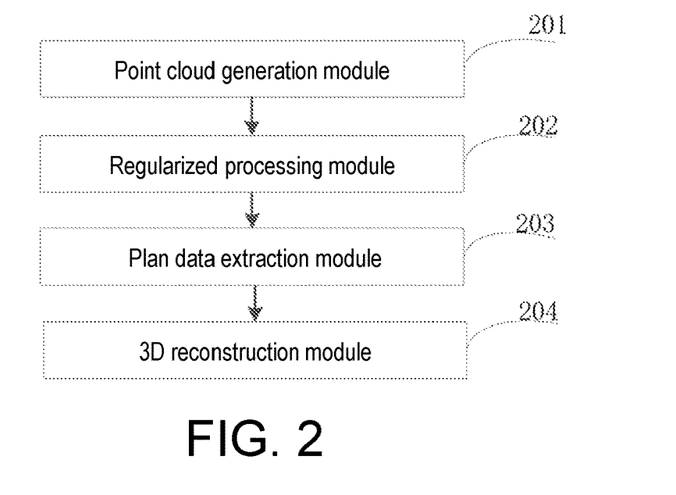
FIG. 2 is a structural block diagram of a device for performing three-dimensional reconstruction of an indoor structure based on a two-dimensional video in an embodiment of the present invention.

Based on the same inventive conception, see FIG. 2, the present embodiment provides a device for 3D reconstruction of indoor structure based on 2D video, comprising:
a point cloud generation module 201, for generating a color point cloud of 3D structure of the house using the captured panoramic video data of the house;

a regularization processing module 202, for regularizing the generated color point cloud of 3D structure of the house;

a plan data extraction module 203, used to vertically project the regularized color point cloud of 3D structure of the house onto the horizontal plane, fit a straight line according to the density of the projected points, perform region division based on the fitted straight line and the spatial division algorithm to get the vector polygon unit that divides the space, and splice the vector polygon unit to get the vector room plan data, wherein the vector room plan data is a vector line map layer of the house obtained by projecting the color point cloud of 3D structure of the house onto the 2D plane;

a 3D reconstruction module 204, for performing reconstruction of a 3D model of the house based on the vector room plan data.

Since the device introduced in Embodiment 2 of the present invention is the device used to implement the 3D reconstruction of the room structure based on the 2D video in Embodiment 1 of the present invention, based on the method introduced in Embodiment 1 of the present invention, the person belonging to the field is able to understand the specific structure and deformations of the device, and therefore will not repeat the details herein. Any device used in the method in Embodiment 1 of the present invention belongs to the scope of the present invention to be protected.

Embodiment 3

Figure 3:
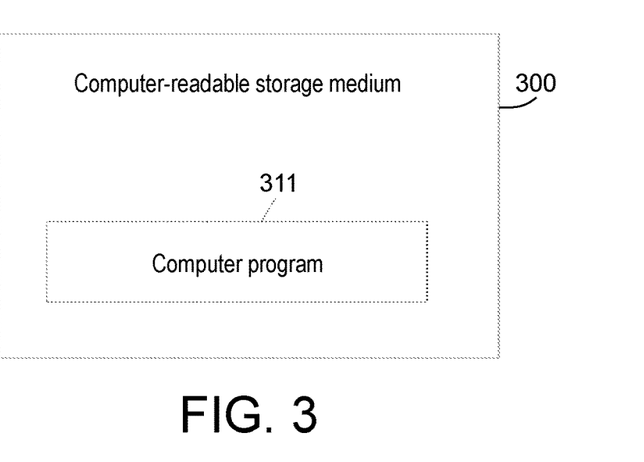
FIG. 3 is a schematic diagram of a structure of a computer-readable storage medium provided by an embodiment of the present invention.

Based on the same inventive concept, see FIG. 3, the present invention also provides a computer-readable storage medium 300 on which is stored a computer program 311 which, when executed, implements the method as described in Embodiment 1.

Since the computer-readable storage medium described in Embodiment 3 of the present invention is a computer-readable storage medium used to implement the three-dimensional reconstruction of indoor structures based on two-dimensional videos in Embodiment 1 of the present invention, based on the method described in Embodiment 1 of the present invention, a person belonging to the field is able to understand the specific structure and deformations of the computer-readable storage medium, and therefore will not be repeated herein. Any computer-readable storage medium used in the method of Embodiment 1 of the present invention belongs to the scope of the present invention to be protected.

Embodiment 4

Figure 4:
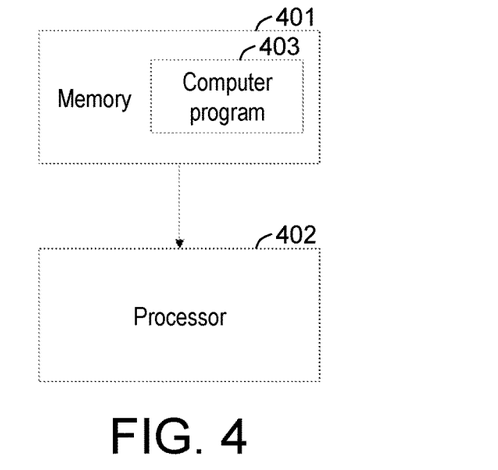
FIG. 4 is a schematic diagram of a structure of a computer device provided in an embodiment of the present invention.

Based on the same inventive concept, please refer to FIG. 4, the present application also provides a computer device comprising a memory 401, a processor 402, and a computer program 403 stored in the memory and runnable on the processor, and the processor executes the above program to realize the method of Embodiment 1.

Since the computer device introduced in Embodiment 4 of the present invention is the computer device used to implement the three-dimensional reconstruction of indoor structure based on two-dimensional video in Embodiment 1 of the present invention, based on the method introduced in Embodiment 1 of the present invention, the person belonging to the field is able to understand the specific structure and deformations of the computer device, and therefore will not repeat the details herein. All of the computer device used in the method in Embodiment 1 of the present invention belongs to the scope of the present invention to be protected.

It should be understood by those skilled in the art that embodiments of the present invention may be provided as methods, systems, or computer program products. Thus, the present invention may take the form of a fully hardware embodiment, a fully software embodiment, or an embodiment that combines software and hardware aspects. Further, the present invention may take the form of a computer program product implemented on one or more computer-usable storage media (including, but not limited to, disk memory, CD-ROM (Compact Disc Read-Only Memory), optical memory, and the like) that contain computer-usable program code therein.

The present invention is described with reference to flowcharts and/or block diagrams of methods, devices (systems), and computer program products according to embodiments of the present invention. It is to be understood that each of the processes and/or boxes in the flowchart and/or block diagram, and the combination of processes and/or boxes in the flowchart and/or block diagram, may be implemented by computer program instructions. These computer program instructions may be provided to a processor of a general-purpose computer, a special-purpose computer, an embedded processor, or other programmable data-processing device to produce a machine such that the instructions executed by the processor of the computer or other programmable data-processing device produce a device for carrying out the functions specified in the one process or processes of the flowchart and/or the one box or boxes of the box diagram.

Although preferred embodiments of the present invention have been described, those skilled in the art may make additional changes and modifications to these embodiments once the underlying inventive concepts are known. Therefore, the appended claims are intended to be construed to include the preferred embodiments as well as all changes and modifications that fall within the scope of the present invention.

Obviously, a person skilled in the art may make various changes and variations to the embodiments of the present invention without departing from the spirit and scope of the embodiments of the present invention. Thus, if these modifications and variations of the embodiments of the present invention fall within the scope of the claims of the present invention and their technical equivalents, the present invention is intended to encompass these modifications and variations as well.

What is claimed is:

1. A method for three-dimensional reconstruction of an indoor structure based on a two-dimensional video, characterized in that the method comprises:

S1: generating a color point cloud of three-dimensional structure of a house using a captured panoramic video data of the house;

S2: regularizing the color point cloud of the three-dimensional structure of the house to obtain a regularized color point cloud;

S3: vertically projecting the regularized color point cloud of the three-dimensional structure of the house onto a horizontal plane, fitting a straight line according to a density of projected points, performing region division based on the fitted straight line and a spatial division algorithm to get a vector polygon units that divides space, and splicing the vector polygon units to get vector room plan data, wherein the vector room plan data is a vector line map layer obtained by projecting the regularized color point cloud of the three-dimensional structure of the house onto a two-dimensional plane;

S4: performing reconstruction of a three-dimensional model of the house based on the vector room plan data, wherein step S1 comprises following steps:

S1.1: establishing a sequence image set on the captured panoramic video data of the house by means of a video stream frame extraction technique, wherein the sequence image set is a sequence of images with temporal correlation;

S1.2: performing image multi-view projection correction on the sequence image set to obtain a sequence multi-view image;

S1.3: based on the obtained sequence multi-view image, generating a three-dimensional sparse point cloud by sequence multi-view image dense matching and structure from motion reconstruction techniques;

S1.4: generating a dense three-dimensional point cloud based on the three-dimensional sparse point cloud using a patch-based multi-view stereo method as the color point cloud of the three-dimensional structure of the house, wherein step S1.2 comprises:

converting an original panoramic image into a three-dimensional panoramic spherical space by using an equirectangular projected spherical panoramic model;

$$\begin{cases} x_{pano}^q = w \cdot \theta_q/2\pi + (w/2 - 1) \\ y_{pano}^q = (h/2 - 1) - h \cdot \phi_q/\pi \end{cases}, (-\pi < \theta \le \pi, -\pi/2 < \phi \le \pi/2) \quad (1)$$

$$\begin{cases} \theta_q = (2\pi \cdot x_{pano}^q + 2\pi)/w - \pi \\ \phi_q = \pi/2 - (\pi - 2\pi \cdot y_{pano}^q)/2h \end{cases}, (0 \le x_{pano}^q < w, 0 \le y_{pano}^q < h) \quad (2)$$

where, $x_{pano}^q$ represents coordinates of image point of $q^{th}$ image in the original panoramic image, $y_{pano}^q$ represents coordinates of the image point of the $q^{th}$ image in the original panoramic image in a space of a three-dimensional panoramic sphere, w represents a length of the original panoramic image, h represents a width of the original panoramic image, q represents a number of images, $\theta_q$ represents an angle of the computed image point in the three-dimensional panoramic sphere in a horizontal x-positive direction, and $\phi_q$ represents an angle of the computed image point in the three-dimensional panoramic sphere in a vertical y-positive direction;

by surrounding the three-dimensional panoramic sphere with a cube whose side length is equal to a diameter of the three-dimensional panoramic sphere, points on a spherical surface of the three-dimensional panoramic sphere are mapped onto a corresponding surface of the cube to obtain 6 multi-view images;

the cube is rotated by 45°, and the points on the spherical surface of the three-dimensional panoramic sphere are mapped onto a corresponding surface of the cube again to obtain another 6 multi-view images;

no less than 6 images in a horizontal x-positive direction and no less than 2 images in a vertical y-positive direction from the 12 multi-view images are selected to constitute the sequence multi-view images of the house.

2. The method for three-dimensional reconstruction of the indoor structure based on the two-dimensional video according to claim 1, wherein step S2 comprises following steps:

S2.1: performing a smoothing operation on the color point cloud of the three-dimensional structure of the house by surface fitting;

S2.2: segmenting a point cloud plane using a region growing algorithm, fitting a planar point cloud using an iterative reweighted least squares method to obtain a plurality of fitted point cloud planes, and calculating a normal vector of each of the fitted point cloud planes;

S2.3: screening vertical planes as alternative wall surfaces based on the calculated normal vector of each of the fitted point cloud planes calculated in S2.2, and then eliminating planes in the screened vertical planes whose heights are below a height threshold, and using retained vertical planes as wall surfaces.

3. The method for three-dimensional reconstruction of the indoor structure based on the two-dimensional video according to claim 2, wherein step S2.3 comprises:

using a formula $|n \cdot v| \le \epsilon$ to determine whether each of the fitted point cloud planes is vertical or not to obtain the vertical planes as the alternative wall surfaces, where n represents the normal vector of each of the fitted point cloud planes, $v=(0, 0, 1)$ T, and $\epsilon$ represents cosine of an angular threshold, and when the angular threshold is 90°±1°, $\epsilon =\cos (90°±1°)$;

within preserved vertical planes, eliminating planes whose height h<a in the vertical planes to obtain a wall surface that satisfies a condition, with a being the height threshold.

4. The method of performing three-dimensional reconstruction of the indoor structure based on the two-dimensional video according to claim 1, wherein step S4 comprises following steps:

S4.1: obtaining floor and ceiling elevation information for each room from a point cloud by using vector room plan data and using a height histogram method;

S4.2: triangulating a ceiling, wall surfaces, and floor polygons of each room using a Delaunay triangulation method to construct a final three-dimensional model of the room.

5. The method for three-dimensional reconstruction of the indoor structure based on the two-dimensional video according to claim 1, wherein step S1.3 comprises:

using a scale-invariant feature transform feature operator to extract feature points for the sequence multi-view image of the house;

using an image matching method of supporting line voting and affine invariant constraint, matching multi-view images of the house to obtain a matching point set of house sequence images;

performing aerial triangulation and sparse point cloud generation on the matching point set of house sequence images by structure from motion, and recovering a camera position of each panoramic image frame to generate a three-dimensional sparse point cloud of the house.

6. A non-transitory computer-readable storage medium, having a computer program stored thereon, wherein when the computer program is executed, the method a according to claim 1 is implemented.

7. A computer device, comprising a memory, a processor and a computer program stored in the memory and runnable on the processor, wherein the processor implements the method according to claim 1 when executing the computer program.

8. An apparatus for three-dimensional reconstruction of an indoor structure based on two-dimensional video, characterized in that the apparatus comprises:

a memory, comprising a point cloud generation module, a regularization processing module, a plan data extraction module and a three-dimensional reconstruction module; and a processor, coupled to the memory, and configured to execute the point cloud generation module, the regularization processing module, the plan data extraction module and the three-dimensional reconstruction module, wherein the point cloud generation module is configured to generate a color point cloud of three-dimensional structure of a house using a captured panoramic video data of the house the regularization processing module is configured to regularize the color point cloud of three-dimensional structure of the house to obtain a regularized color point cloud;

the plan data extraction module is configured to vertically project the regularized color point cloud of the three-dimensional structure of the house after regularizing the processing onto a horizontal plane, fit a straight line according to a density of projected points, perform region division based on the fitted straight line and a spatial division algorithm to get vector polygon unit that divides space, and splice the vector polygon unit to get vector room plan data, wherein the vector room plan data is a vector line map layer of the house obtained by projecting the regularized color point cloud of the three-dimensional structure of the house onto a two-dimensional plane;

the three-dimensional reconstruction module is configured to perform reconstruction of a three-dimensional model of the house based on the vector room plan data, wherein the regularization processing module is configured to:

S1.1: establish a sequence image set on the captured panoramic video data of the house by means of a video stream frame extraction technique, wherein the sequence image set is a sequence of images with temporal correlation;

S1.2: perform image multi-view projection correction on the sequence image set to obtain a sequence multi-view image;

S1.3: based on the obtained sequence multi-view image, generate a three-dimensional sparse point cloud by sequence multi-view image dense matching and structure from motion reconstruction techniques;

S1.4: generate a dense three-dimensional point cloud based on the three-dimensional sparse point cloud using a patch-based multi-view stereo method as the color point cloud of the three-dimensional structure of the house, wherein step S1.2 comprises:

converting an original panoramic image into a three-dimensional panoramic spherical space by using an equirectangular projected spherical panoramic model;

$$\begin{cases} x^q_{pano} = w \cdot \theta_q / 2\pi + (1/2 - 1) \\ y^q_{pano} = (h/2 - 1) - h \cdot \phi_q / \pi \end{cases}, (-\pi < \theta \le \pi, -\pi/2 < \phi \le \pi/2) \quad (1)$$

$$\begin{cases} \theta_q = (2\pi \cdot x^q_{pano} + 2\pi) / w - \pi \\ \phi_q = \pi/2 - (\pi - 2\pi \cdot y^q_{pano}) / 2h \end{cases}, (0 \le x^q_{pano} < w, 0 \le y^q_{pano} < h) \quad (2)$$

where, $x_{pano}^q$ represents coordinates of image point of $q^{th}$ image in the original panoramic image, $y_{pano}^q$ represents coordinates of the image point of the $q^{th}$ image in the original panoramic image in a space of a three-dimensional panoramic sphere, w represents a length of the original panoramic image, h represents a width of the original panoramic image, q represents a number of images, $\theta_q$ represents an angle of the computed image point in the three-dimensional panoramic sphere in a horizontal x-positive direction, and $\phi_q$ represents an angle of the computed image point in the three-dimensional panoramic sphere in a vertical y-positive direction;

by surrounding the three-dimensional panoramic sphere with a cube whose side length is equal to a diameter of the three-dimensional panoramic sphere, points on a spherical surface of the three-dimensional panoramic sphere are mapped onto a corresponding surface of the cube to obtain 6 multi-view images;

the cube is rotated by 45°, and the points on the spherical surface of the three-dimensional panoramic sphere are mapped onto a corresponding surface of the cube again to obtain another 6 multi-view images;

no less than 6 images in a horizontal x-positive direction and no less than 2 images in a vertical y-positive direction from the 12 multi-view images are selected to constitute the sequence multi-view images of the house.

\* \* \* \* \*